Jan. 10, 1967  L. W. BURNETT  3,296,670
ROPE FASTENING DEVICE
Filed July 23, 1965  2 Sheets-Sheet 1
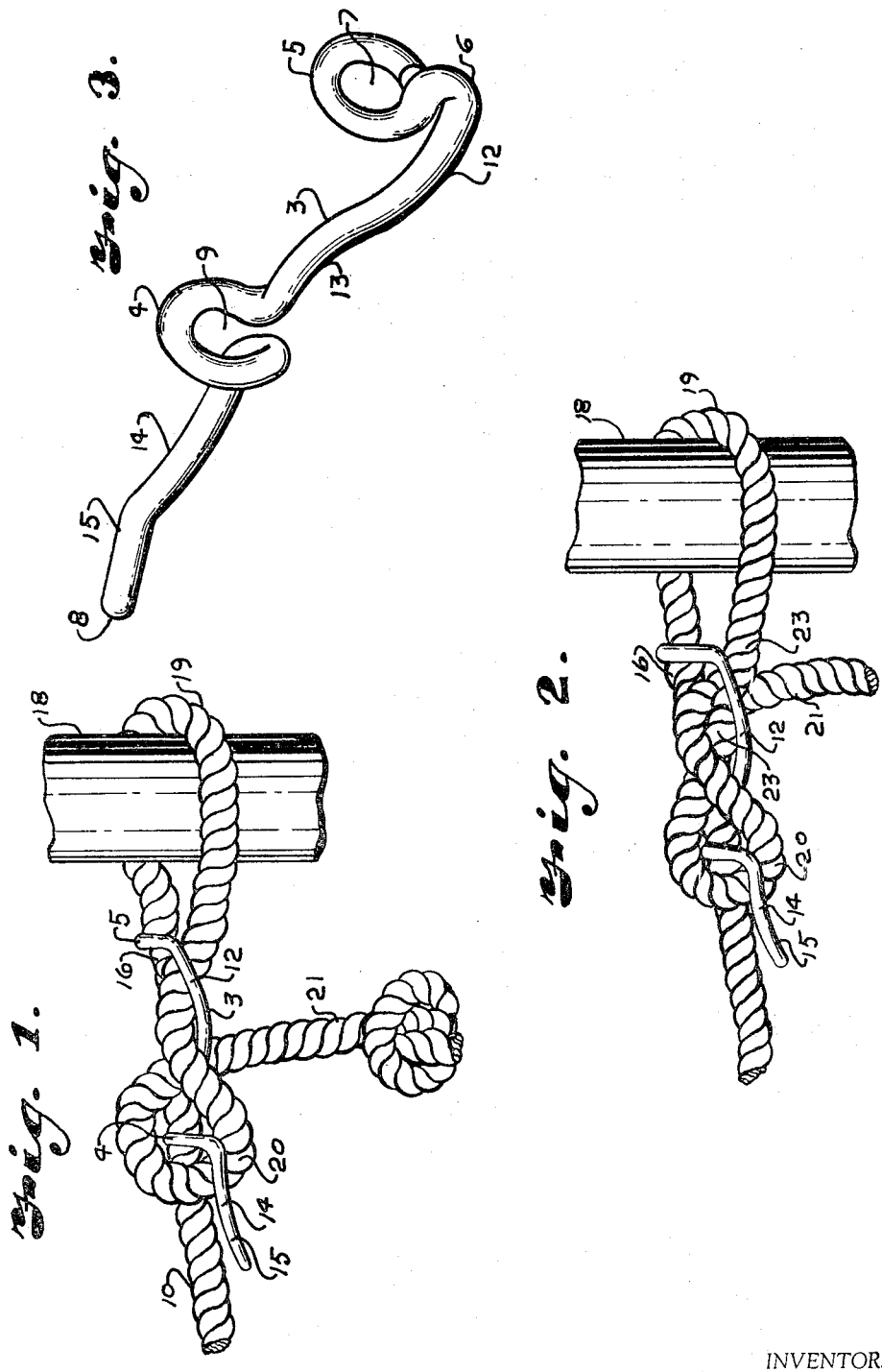
INVENTOR.
LAUREN W. BURNETT
BY
Fishburn and Gold
ATTORNEYS Jan. 10, 1967 L. W. BURNETT 3,296,670
ROPE FASTENING DEVICE
Filed July 23, 1965 2 Sheets-Sheet 2
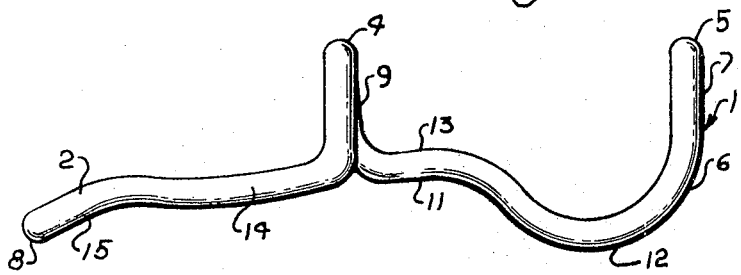
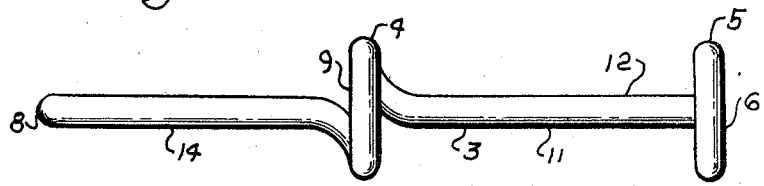
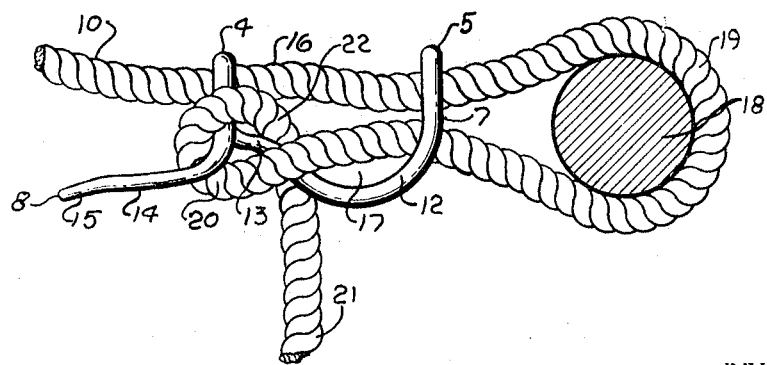
INVENTOR.
LAUREN W. BURNETT
BY
ATTORNEYS United States Patent Office 3,296,670
Patented Jan. 10, 1967

3,296,670
ROPE FASTENING DEVICE
Lauren W. Burnett, 2021 Penn, Kansas City, Mo. 64108
Filed July 23, 1965, Ser. No. 474,304
10 Claims. (Cl. 24—131)

This invention relates to a securing device, and more particularly to a quick fastener for utilization with ropes, cords and other securing means.

The principal objects of this invention are to provide a novel and efficient means for securing a rope or cord about a support, such as a post or arm, or other structure without the necessity of knotting or tying said rope or cord; to provide a device which will facilitate the securing of a rope or cord about a support member; to provide a novel and efficient device for securing a rope or cord without knotting of same which facilitates ease of removal of said rope or cord when same has been subjected to weather or moisture; to provide a new and efficient means for securing a boat to a boat dock or other support means wherein moisture in the rope or cord will not inhibit the tying or untying of said rope or cord to or from the support means; to provide a securing device which will not allow the rope to slip when secured in one way and when secured in another way allows the rope to slip; and to provide a securing device which may be inexpensively and simply constructed.

Other objects and advantages of this invention will become apparent from the following description taken in connection with the accompanying drawings wherein are set forth by way of illustration and example certain embodiments of this invention.

FIG. 1 is a perspective view showing the securing device as utilized with a rope or cord which is secured about a vertical support.

FIG. 2 is a perspective view showing the securing device as utilized with a rope or cord which is secured about a vertical support and further illustrates a modification in the method of tying or securing the rope to the securing device which allows slippage of the securing device along the rope to tighten the rope about the vertical support.

FIG. 3 is a perspective view of the securing device.

FIG. 4 is a top elevational view of the securing device.

FIG. 5 is a side view of the securing device.

FIG. 6 is a top view of the combination of rope securing device and support shown in FIG. 1.

Referring to the drawings in more detail:

The numeral 1 generally indicates the securing device embodying the features of this invention. As illustrated, the securing device 1 is comprised of an elongated continuous rod-like member 2 which is formed into a shaft member 3 with eyelets 4 and 5 extending outwardly from said shaft member. Eyelet 5 is located at the forward end 6 of the shaft member 3 and is formed by bending and twisting of the rod-like member 2 to provide an opening 7. Eyelet 4, also formed by a similar bending and twisting of the rod-like member 2, is located centrally of the forward end 6 and rearward end 8 of the shaft 3 and extends outwardly from said shaft 3 in the same direction as eyelet 5. Eyelets 4 and 5 provide openings 7 and 9, respectively, whose center points lie generally upon an aligned axis through said eyelets. The aligned openings 7 and 9 provide a passage for rope 10. The shaft member 3 located between eyelets 4 and 5 is laterally offset forming U-shaped bent portion 12 which extends rearwardly from the forward eyelet 5 and outwardly in a direction opposite to that of the extension of eyelets 4 and 5. The shaft member 3 is also comprised of a portion 13 extending between the U-shaped bent portion 12 and the centrally located eyelet 4. The shaft portion 13 extends generally parallel to the axis of alignment of openings 7 and 9 of eyelets 4 and 5. A tail portion 14 of shaft 3 extends rearwardly from the eyelet 4 terminating in an obliquely bent portion 15 at the rearward end 8 of shaft 3. The portion 15 extends obliquely outwardly in the same direction as the offset or U-shaped bent portion 12. Referring to FIG. 5, the shaft member 3 and tail portion 14 lie straightly in the horizontal plane and are generally aligned with one another and with the center axis of eyelets 4 and 5. The bent portions 15 and 12 of the shaft 3, as best illustrated in FIG. 4, extend outwardly in the same general direction and opposite that of the direction of extension of the eyelets 4 and 5.

Referring to FIG. 1, it will be noted that the rope 10 extends through eyelets 4 and 5 having a portion 16 disposed between said eyelets, the portion 16 of the rope 10 defining an open area 17 located between the portion 16 of the rope 10 and the offset or U-shaped bent portion 12 of the securing device 1. The rope 10 extends forwardly from the eyelet 5 and loops about the vertical support 18 with a first loop portion 19 to secure the rope to the vertical support 18. A second loop portion 20 extends upwardly through the open area 17 between the portion 16 of the rope 10 and the offset or U-shaped bent portion 12. The second loop portion 20 is then hooked over the tail portion 14 of the securing device 1. The obliquely bent end portion 15 facilitates the slippage of the second loop portion 20 of the rope 10 over the tail portion 14. The end portion 21 of the rope 10 which extends downwardly through the open area 17 is then pulled downwardly to tighten the loop 20 about the eyelet 4.

Referring to FIG. 6, the end portion 21 of the loop 20 which passes around the tail portion 14 is pulled rearwardly along the portion 13 of the shaft member 3 to a position between the portion 16 of the rope 10 and said shaft portion 13 of the shaft 3 of the securing device 1. The insertion of the portion 22 of the rope 10 into the restricted space between portion 16 of the rope 10 and the securing device 1 results in a binding effect between the portion 16 of the rope 10 and eyelet 4. The outward force applied to portion 16 of the rope 10 by the insertion of portion 21 of the rope 10 into this restricted area increases the friction between the eyelet 4 and the rope 10 such that slippage of the securing device 1 along the rope 10 is prevented. An outward force exerted on the rope 10 will not tighten the loop 19 about the vertical support 18 as long as the portion 19 of the rope 10 is disposed between the straight portion 13 of the shaft 3 and the portion 16 of the rope 10.

Where slippage of the securing device along the rope 10 is desired in order to tighten the loop 19 about the vertical support 18, the rope 10 is arranged in the securing device 1 in the manner shown in FIG. 2. The disposition of the rope 10 is achieved by a clockwise twist of the loop 20 one full revolution after it passes through the open area 17 between the portion 16 of the rope 10 and the offset or U-shaped bent portion 12 of the securing device 1. The loop portion 20, twisted in the aforestated manner as shown at 23, is then hooked over the tail portion 14 of the securing device 1. It will be noted in FIG. 2 that the end portion 21 and the intermediate portion 24 between loops 19 and 20 are disposed in the open area 17 between the portion 16 of the rope 10 and the offset or U-shaped bent portion 12 of the securing device 1. With the portions 21 and 23 of the rope 10 disposed in the open area 17, the outward pressure on the portion 16 of the rope 10 is avoided, thus preventing a frictional engagement between the rope 10 and eyelet 4 and allowing slippage of the securing device 1 along the portion 16 of the rope 10 in order to tighten the loop 19 about the supporting member 18.

In order to disconnect the rope member 10 from the vertical support 18, it is necessary to disengage the loop 20 from the tail portion 14 of the securing device 1. This is accomplished by removing the rope portion 22 from its engagement between the portion 13 of the shaft 3 and the portion 16 of the rope 10 by pulling the portion 22 forwardly toward the eyelet 5 and then loosening the loop 20 to allow it to be slipped over tail portion 15. An outward pressure is then exerted on the end portion 21 of the rope 10 which pulls the loop portion 20 of the rope 10 through the open area 17 between the portion 16 of the rope 10 and the offset or U-shaped bent portion 12 of the securing device 1.

It should be noted that swelling of the ropes due to increased moisture content would have little effect upon this detaching operation as the open area 17 between the portion 16 of the rope 10 and the U-shaped bent portion 12 of the securing device 1 may be sufficiently large to compensate for increased swelling of the rope due to added moisture content.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:

1. A securing device, comprising:
   (a) a shaft having a forward and rearward end,
   (b) a first eyelet on the shaft at the forward end and having an opening therein,
   (c) a second eyelet on the shaft in spaced relation to the first eyelet and the rearward end of the shaft and having an opening substantially aligned with the opening in the first eyelet, and
   (d) a laterally offset portion of the shaft between the first and second eyelets, said offset being in a direction opposite from said eyelets and offset from a plane generally through the periphery of said openings,
   (e) the rearward end portion of said shaft including a tail portion extending rearwardly from said second eyelet.

2. A securing device, comprising:
   (a) a shaft,
   (b) substantially aligned eyelets in spaced relation on said shaft defining openings for receipt of a rope-like member to retain the securing device in a slipping engagement on the rope-like member, and
   (c) a laterally offset portion of the shaft between the rope-like member receiving means and said portion being offset in an opposite direction from said means beyond a plane generally through the periphery of said openings,
   (d) a tail member connected to and extending outwardly from one of said eyelets.

3. A securing device, comprising:
   (a) a shaft,
   (b) substantially aligned eyelets in spaced relation on said shaft defining openings for receipt of a rope-like member to retain the securing device in a slipping engagement on the rope-like member,
   (c) a laterally offset portion of the shaft between the rope-like member receiving means and said portion being offset in an opposite direction from said means and beyond a plane generally through the periphery of the opening in said eyelets, and
   (d) a second portion of said shaft between the laterally offset portion and the means for receiving the rope-like member and adjacent said means, said second portion extending generally parallel to the axis of alignment of said means,
   (e) a tail member connected to and extending outwardly from one of said eyelets.

4. A securing device, comprising:
   (a) a shaft having forward and rearward end portions,
   (b) a first eyelet on the forward end portion of the shaft and integral therewith and having an opening therein,
   (c) a second eyelet on the rearward end portion of the shaft and integral therewith in spaced relation to the first eyelet and having an opening in substantially axial alignment with the opening in the first eyelet,
   (d) the forward end portion of the shaft between the axially aligned eyelets having a laterally offset portion adjacent the first eyelet and being offset in a direction opposite that of the eyelets and a second portion between the laterally offset portion and second eyelet extending generally parallel to the aligned axis of the eyelets, and
   (e) the rearward end portion of the shaft having a tail portion which extends rearwardly from the second eyelet.

5. A securing device, comprising:
   (a) a shaft having forward and rearward end portions,
   (b) spaced means on each of said shaft portions having substantially axially aligned substantially closed openings therein for receipt of a rope-like member,
   (c) a laterally offset portion in the forward end portion of the shaft between said receiving means of the forward and rearward end portions of the shaft, said portion being offset beyond a plane generally through the periphery of said openings, and
   (d) the rearward end portion of the shaft having a tail portion which extends rearwardly from one of said means.

6. A combination for securing a rope-like member to a support or other structure comprising:
   (a) a securing device being comprised of:
      (1) a shaft having a forward and rearward end,
      (2) a first eyelet on the shaft at the forward end and having an opening therein,
      (3) a second eyelet on the shaft in spaced relation to the first eyelet and the rearward end of the shaft and having an opening substantially axially aligned with the opening in the first eyelet,
      (4) a laterally offset portion of the shaft between the first and second eyelets being offset in an opposite direction from said eyelets, and
      (5) a tail member connected to and extending rearwardly from said second eyelet,
   (b) a rope-like member having two end portions and two loop portions, the first end portion being received in the eyelets on said shaft, the first loop portion extending outwardly from the eyelets and terminating in a second loop portion, the second loop portion being received between the laterally offset portion of the shaft and the first end portion of the rope-like member and said second loop portion being received over the rearward tail member of the shaft.

7. The securing device recited in claim 6 wherein the second loop portion of the rope-like member is twisted a full revolution, preventing a binding of the rope-like member in the securing device and allowing slippage of the securing device along the rope-like member.

8. A securing device, comprising:
   (a) a shaft having forward and rearward ends,
   (b) a first eyelet on the shaft at the forward end and having an opening therein,
   (c) a second eyelet on the shaft in spaced relation to the first eyelet and the rearward end of the shaft and having an opening in substantial alignment with the opening in the first eyelet,
   (d) a laterally offset portion of the shaft between the first and second eyelets, said portion being offset in an opposite direction from said eyelets,
   (e) a straight portion of the shaft between the laterally offset portion and the second eyelet and adjacent said eyelet extending generally parallel to the axis of alignment of the eyelet openings,
   (f) a tail portion of said shaft extending rearwardly of said second eyelet, (g) a rope having two end portions and two loop portions, the first end portion being received in the eyelets on said shaft, the first loop portion extending outwardly from the eyelets and terminating in a second loop portion, the second loop portion being received between the laterally offset portion of the shaft and over the tail portion of the shaft, with the second end portion extending between the first end portion of the rope and the straight portion of the shaft thereby causing a binding of the first end portion of the rope with the second eyelet and preventing slippage of the securing device along the rope.

9. A combination for securing a rope-like member to a support or other structure comprising:
   (a) a securing device being comprised of:
      (1) a shaft having forward and rearward end portions,
      (2) a means on each of said shaft portions having axially aligned openings therein for receipt of a rope-like member,
      (3) a laterally offset portion of the shaft in the forward end portion between the receiving means of the forward and rearward end portions of the shaft,
      (4) the rearward end portion of the shaft having a tail portion which extends rearwardly from the rope-like member receiving means on the rearward end portion of the shaft,
   (b) a rope-like member having two end portions and two loop portions, the first end portion being received in the receiving means on each of the shaft portions, the first loop portion extending outwardly from the securing device and terminating in a second loop portion, the second loop portion being received between the laterally offset portion of the shaft and the first end portion of the rope-like member and said second loop portion being received over the tail portion of the rearward end portion of the shaft.

10. A combination as recited in claim 9 wherein the shaft of the securing device has a straight portion between the laterally offset portion and the receiving means of the rearward portion of the shaft and adjacent said receiving means which extends generally parallel to the alignment axis of the receiving means and the second end of the rope-like member is disposed between the straight portion of the shaft and the first end portion of the rope-like member whereby a binding occurs between the receiving means of the rearward shaft portion and the first end portion of the rope-like member preventing slippage of the securing device along the rope-like member.

References Cited by the Examiner

UNITED STATES PATENTS

| | | | |
|---|---|---|---|
| 295,212 | 3/1884 | Van Wagener | 24—131 X |
| 782,657 | 2/1905 | Hubert | 24—131 |
| 1,356,316 | 10/1920 | Shepherd | 24—131 |
| 2,709,287 | 5/1955 | Shelton. | |
| 2,984,938 | 5/1961 | Crawford. | |

BERNARD A. GELAK, *Primary Examiner.*